United States Patent
Weber et al.

(10) Patent No.: US 12,377,986 B2
(45) Date of Patent: Aug. 5, 2025

(54) OXYGEN PRESSURE RELIEF AND VENTILATION SYSTEM AND METHOD

(71) Applicant: Textron Aviation Inc., Wichita, KS (US)

(72) Inventors: Scott William Weber, Goddard, KS (US); Sam Khounsombath, Wichita, KS (US); Trey Marcus Siemens, Wichita, KS (US); Richard Lee Gaines, Augusta, KS (US)

(73) Assignee: Textron Innovations Inc., Providence, RI (US)

( * ) Notice: Subject to any disclaimer, the term of this patent is extended or adjusted under 35 U.S.C. 154(b) by 462 days.

(21) Appl. No.: 18/056,846

(22) Filed: Nov. 18, 2022

(65) Prior Publication Data

US 2023/0150675 A1 May 18, 2023

Related U.S. Application Data

(60) Provisional application No. 63/280,685, filed on Nov. 18, 2021.

(51) Int. Cl.
*B64D 13/02* (2006.01)
*G10K 11/16* (2006.01)

(52) U.S. Cl.
CPC .......... *B64D 13/02* (2013.01); *G10K 11/161* (2013.01); *B64D 2231/025* (2013.01)

(58) Field of Classification Search
CPC ........ B64D 13/02; B64D 2231/02; A62B 7/14
See application file for complete search history.

(56) References Cited

U.S. PATENT DOCUMENTS

| | | | |
|---|---|---|---|
| 3,016,061 | A | 1/1962 | Maddock |
| 6,990,991 | B2 | 1/2006 | Meckes et al. |
| 7,341,072 | B2 | 3/2008 | Talty |
| 10,369,389 | B2 | 8/2019 | Cannon |
| 2019/0321660 | A1 | 10/2019 | Klockiewicz et al. |

*Primary Examiner* — Edelmira Bosques
*Assistant Examiner* — Michael James Giordano
(74) *Attorney, Agent, or Firm* — Avek IP, LLC

(57) ABSTRACT

An oxygen pressure relief and ventilation system includes a flow fuse fluidly coupled downstream of a pressure regulator. The pressure regulator is operatively coupled to an oxygen tank, and the oxygen tank is located in an unpressurized compartment of an aircraft. A pressure relief valve is fluidly coupled downstream of the flow fuse. A ventilation pathway fluidly couples the unpressurized compartment with a pressurized compartment. The flow fuse and the pressure relief valve are configured to cooperatively mitigate downstream flow of pressurized oxygen if the pressure regulator fails. The ventilation pathway is configured to allow air from the pressurized compartment to pass through to the unpressurized compartment for diluting a concentrated oxygen in the unpressurized compartment.

12 Claims, 5 Drawing Sheets

//OXYGEN PRESSURE RELIEF AND VENTILATION SYSTEM AND METHOD

CROSS-REFERENCE TO RELATED APPLICATIONS

This application claims the benefit of priority of U.S. Provisional Patent Application No. 63/280,685 entitled Oxygen Pressure Relief and Ventilation System And Method and filed on Nov. 18, 2021, the disclosure of which is herein incorporated by reference in its entirety.

BACKGROUND

1. Field

Embodiments of the invention relate generally to the field of aircraft supplemental oxygen systems, and more specifically to pressure relief and ventilation of aircraft supplemental oxygen systems.

2. Related Art

Safety mechanisms for emergency oxygen systems onboard aircraft are known. For example, U.S. Patent Application Publication No. 2019/0321660 to Klockiewicz et al. discloses an emergency oxygen system for an aircraft having a relief valve configured to vent pressure if a threshold is exceeded. U.S. Pat. No. 7,341,072 to Talty discloses a centralized flow control unit that regulates oxygen flow from an emergency oxygen distribution system in an aircraft. The flow control unit includes a flow control valve and a relief valve.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, an oxygen pressure relief and ventilation system includes: a flow fuse fluidly coupled downstream of a pressure regulator, wherein the pressure regulator is operatively coupled to an oxygen tank, and the oxygen tank is located in an unpressurized compartment of an aircraft; a pressure relief valve fluidly coupled downstream of the flow fuse; and a ventilation pathway fluidly coupling the unpressurized compartment with a pressurized compartment, wherein the flow fuse and the pressure relief valve are configured to cooperatively mitigate downstream flow of pressurized oxygen if the pressure regulator fails, and wherein the ventilation pathway is configured to allow air from the pressurized compartment to pass through to the unpressurized compartment for diluting a concentrated oxygen in the unpressurized compartment.

In another embodiment, a method for protecting against a failed pressure regulator of an oxygen system includes: partially blocking flow of a pressurized oxygen downstream of a failed pressure regulator via one or more flow fuses to isolate downstream components of the oxygen system from the pressurized oxygen; venting flow of the pressurized oxygen into an unpressurized compartment via one or more pressure relief valves to relieve pressure from the pressurized oxygen; and ventilating the unpressurized compartment with air from an occupied compartment via a pathway for diluting an oxygen concentration in the unpressurized compartment.

In yet another embodiment, a backup system for relieving oxygen pressure following failure of a pressure regulator includes: one or more flow fuses fluidly coupled downstream of one or more pressure regulators, respectively, wherein the one or more pressure regulators are operatively coupled to one or more oxygen tanks configured to supply oxygen to oxygen masks onboard an aircraft, and wherein the one or more flow fuses are configured to partially block a pressurized oxygen from flowing downstream to the one or more oxygen masks if the one or more pressure regulators fail; and a ventilation subsystem configured to fluidly couple an unpressurized compartment containing the oxygen tanks with a pressurized compartment, wherein the ventilation subsystem is configured to pass air from the pressurized compartment to the unpressurized compartment for diluting a high concentration of oxygen in the unpressurized compartment.

BRIEF DESCRIPTION OF THE DRAWING FIGURES

Embodiments of the invention are described in detail below with reference to the attached drawing figures, wherein.

Figure 1:
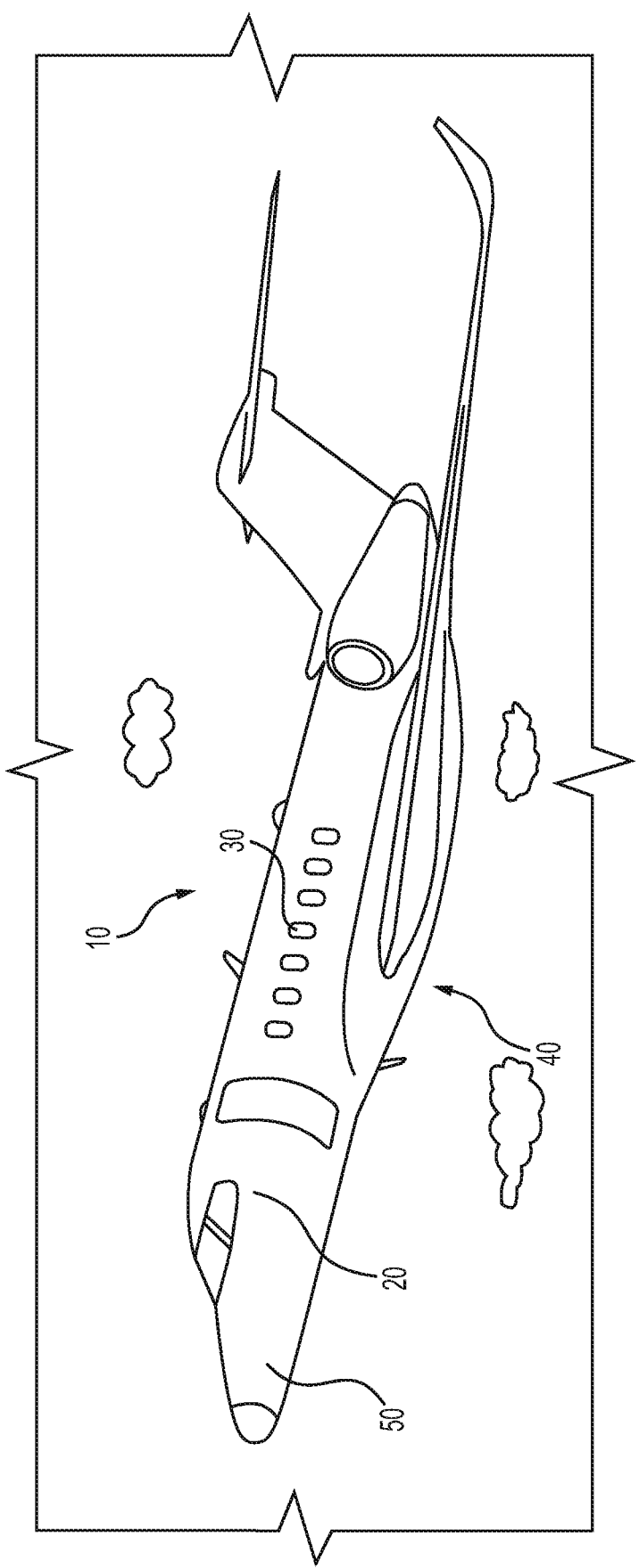
FIG. 1 shows an embodiment of an aircraft configured with an oxygen pressure relief and ventilation system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft that fly above certain altitudes (e.g., 10,000-feet above sea level or higher) typically require oxygen safety systems to provide 100% pure oxygen to crew and passengers via oxygen masks within the cabin and/or cockpit. The oxygen safety system includes one or more high-pressure gaseous oxygen tanks that store oxygen for the crew and passengers to access during the flight (e.g., when the aircraft cabin pressure altitude is above 10,000-feet). Such tanks may be stored with a nominal pressure of about 1,850 pounds per square inch (psi). At such a high pressure, releasing oxygen directly from the tank would damage downstream equipment, such as oxygen masks. Accordingly, the tanks are equipped with a pressure regulator, which reduces the pressure of the oxygen released from the tank to between about 60 psi to about 90 psi. The system relies heavily upon the stability and proper functioning of the single pressure regulator. Failure of the pressure regulator can lead to loss of the oxygen supply for the crew and passengers. Leakage from the oxygen system may lead to oxygen buildup within the compartment housing the oxygen supply system, which significantly increases the fire risk within the compartment. Furthermore, leakage that could occur upon failure of the regulator may also damage downstream components in the oxygen supply system. Therefore, safety systems are needed as a backup in case the pressure regulator fails.

FIG. 1 shows an aircraft 10 configured with an oxygen pressure relief and ventilation system. Aircraft 10 contains a cockpit 20 and a cabin 30, which collectively represent the occupied compartment 40. The occupied compartment 40 may be occupied by one or more of pilots, crew, passengers, or cargo. In embodiments, aircraft 10 is a pressurized aircraft such that occupied compartment 40 is pressurized. Pressurized aircraft are typically operated at altitudes above about 10,000-feet above sea level. At these altitudes, a pressurization system onboard the aircraft 10 maintains the pressure of the occupied compartment 40 at roughly the equivalent to the pressure at 10,000-feet or lower. Pressurized aircraft also, in some embodiments, include an oxygen supply system as a backup safety mechanism, for example, in the event that the pressurization system fails (i.e., the occupied compartment 40 pressure altitude exceeds 10,000-feet). The oxygen supply system may be located in an unpressurized zone, such as within an unpressurized compartment 50, for safety reasons. Unpressurized compartments on aircraft may include the nose, tail, wings, or other spaces not occupied by passengers or crew.

Figure 2:
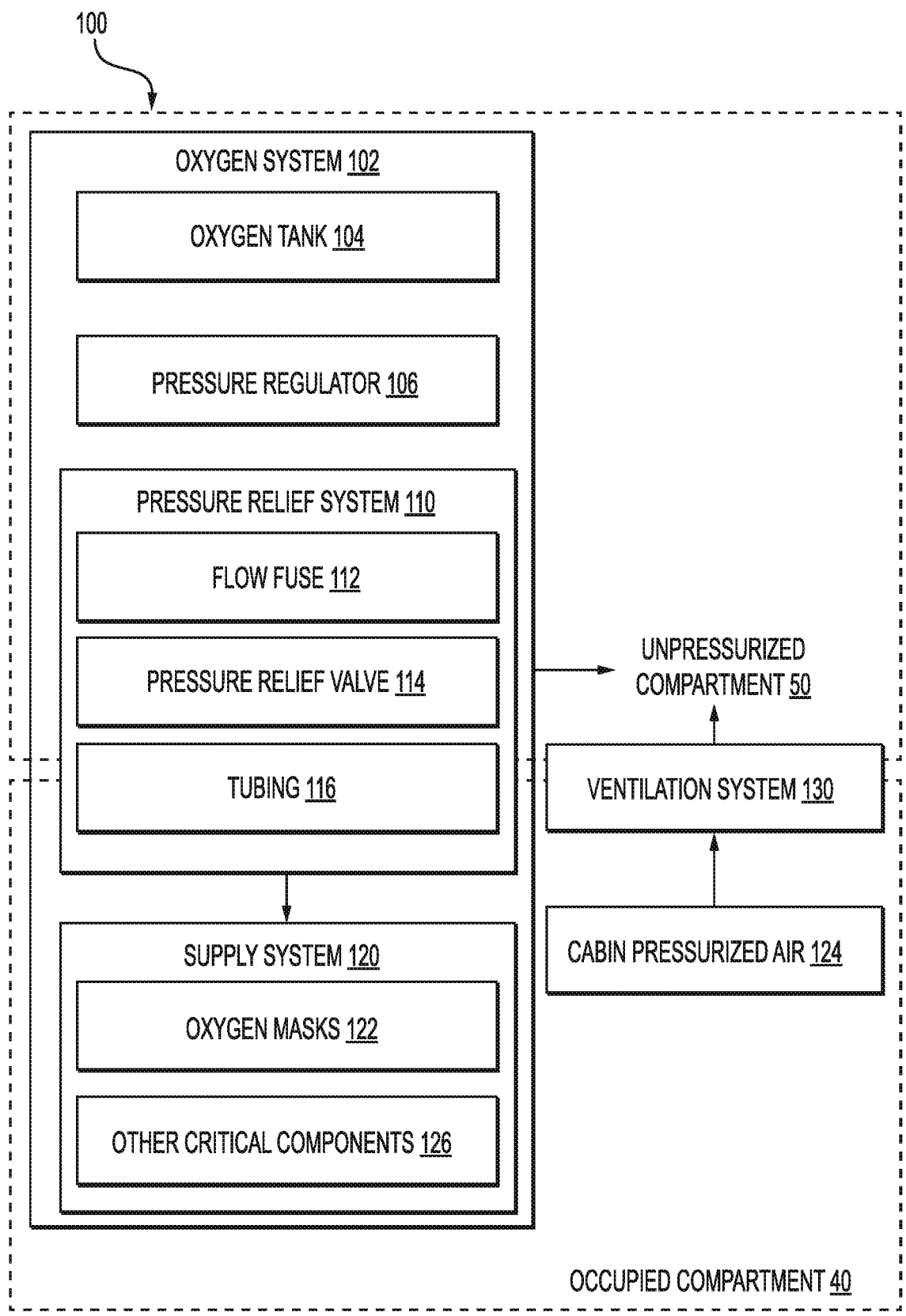
FIG. 2 is a diagram showing the oxygen pressure relief and ventilation system of some embodiments.

FIG. 2 depicts an oxygen pressure relief and ventilation system 100, in some embodiments. Oxygen system 102 may, in some embodiments, include an oxygen tank 104 and a pressure regulator 106. In some embodiments, portions of oxygen system 102 (e.g., oxygen tank 104, pressure regulator 106, a flow fuse 112, and a pressure relief valve 114) may be located in an unpressurized compartment, such as compartment 50. In some embodiments, there may be one or more oxygen tanks 104 supplying oxygen to the crew and passenger oxygen masks 122. In these embodiments, there may be one or more pressure regulators 106 corresponding to each of the one or more oxygen tanks 104. For example, in some embodiments, there may be three oxygen tanks 104 and three pressure regulators 106, such that each oxygen tank 104 is equipped with a pressure regulator 106. In embodiments, the configuration of oxygen system 102 (e.g., size of oxygen tank 104, number of oxygen tanks 104, etc.) may be determined depending on one or more of the maximum number of crew and passengers, the cruising altitude of aircraft 10, or the duration of the flight.

In some embodiments, the oxygen tank 104 and pressure regulator 106 may be fluidly coupled to a pressure relief system 110, which in turn may be coupled to supply system 120. In some embodiments, the pressure relief system 110 may be a subsystem of the aircraft oxygen system 102. In some embodiments, the supply system 120 may be a subsystem of the oxygen system 102. Portions of the pressure relief system 110 are further depicted in FIG. 3, and as such, FIGS. 2 and 3 may be best viewed together with the following description. In some embodiments, pressure relief system 110 may include tubing 116. Tubing 116 may be used to fluidly couple different components of oxygen system 102. In some embodiments, tubing 116 may comprise a semi-rigid material. In some embodiments, tubing 116 may comprise one or more of a plastic or a rubber. In some embodiments, tubing 116 may comprise a substantially rigid material. In some embodiments, tubing 116 may comprise a hollow metal pipe. In some embodiments, tubing 116 may direct oxygen to the supply system 120.

In embodiments, supply system 120 may include oxygen masks 122 and other critical components 126 of the oxygen system 102 that are located in occupied compartment 40, as shown in FIG. 2. Portions of supply system 120 may be rated to withstand a specific amount of pressure (e.g., about 90 psi to about 135 psi). As such, pressures higher than this rating caused by, for instance, failure of pressure regulator 106, may cause damage and/or failure of portions of supply system 120. Below, embodiments will be discussed which may prevent damage of supply system 120 upon failure of pressure regulator 106.

Figure 3:
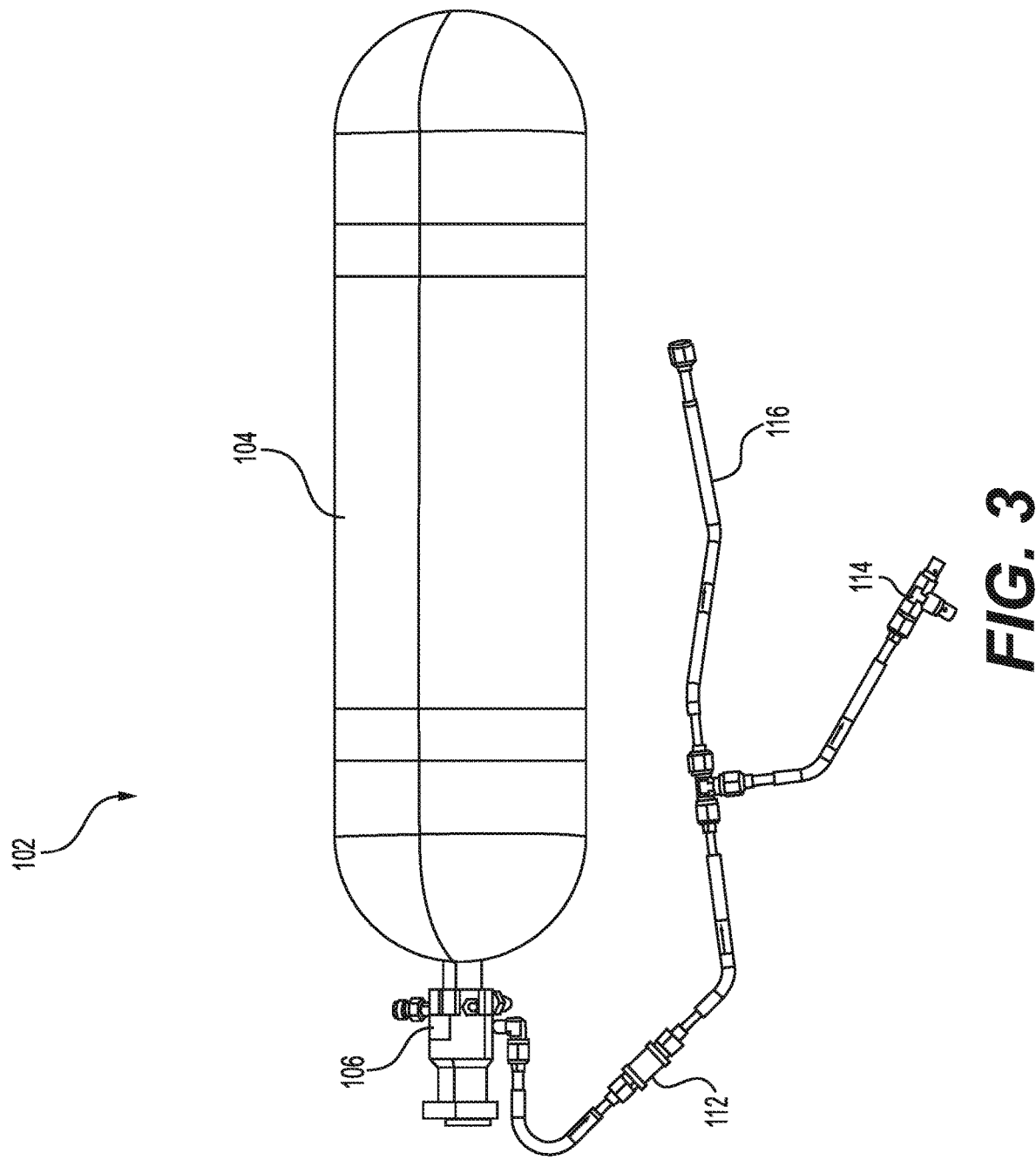
FIG. 3 shows a first portion of the oxygen pressure relief and ventilation system of FIG. 2, in some embodiments.

In embodiments, pressure relief system 110 may include flow fuse 112 (e.g., a flow fuse, an airflow fuse, or an air shutoff valve) and pressure relief valve 114 (see FIGS. 2-3). In embodiments, the flow fuse 112 may be disposed downstream of the pressure regulator 106. In some embodiments, the flow fuse 112 may be disposed upstream of the pressure relief valve 114. In some embodiments, flow fuse 112 may comprise a pneumatically-actuated valve, such as a poppet valve. In some embodiments, flow fuse 112 may comprise a spring-loaded mechanism which biases the flow fuse 112 in a first position. In the first position, flow fuse 112 may allow pressurized oxygen from oxygen system 102 to reach supply system 120. In some embodiments, flow fuse 112 may be configured to isolate pressurized oxygen of oxygen system 102 from downstream components (e.g., oxygen masks 122) upon a failure of pressure regulator 106. For example, the flow of pressurized oxygen may exert a dynamic pressure force on the flow fuse 112. If the flow of pressurized oxygen rises to a predetermined pressure, the resulting pressure overcomes the spring force and pushes the flow fuse 112 to a second position (e.g., against a seat). In embodiments, this may substantially block flow through the flow fuse 112, thereby isolating high pressure oxygen flow from the downstream system components (e.g., supply system 120). For example, if pressure regulator 106 fails and pressurized oxygen is released at a pressure that surpasses the maximum normal 90 psi, the spring-loaded mechanism of flow fuse 112 may be triggered, therein biasing flow fuse 112 into the second position. In these embodiments, flow fuse 112 may substantially prevent high pressure surges of oxygen from oxygen system 102 from traveling to downstream systems, such as supply system 120. In some embodiments, flow fuse 112 may comprise a mechanism configured for actuation to the second position upon exposure to a pressure of about 100 psi and above. In some embodiments, flow fuse 112 may automatically reset back to the first position when upstream pressure is restored below the maximum normal 90 psi. In some embodiments, pressure relief system 110 may comprise one or more flow fuses 112. For example, if more than one oxygen tank 104 and pressure regulator 106 are used for oxygen system 102, a plurality of flow fuses 112 may be used to direct pressurized oxygen flow from each oxygen tank 104 and pressure regulator 106. In some embodiments, one flow fuse 112 may be used to direct air flow from multiple oxygen tanks 104. For example, tubing may connect pressurized oxygen flow streams from two or more oxygen tanks 104 to a single flow stream via a manifold. In this case, a single flow fuse 112 may be placed downstream of the flow stream convergence (e.g., downstream of the manifold), thereby, in some embodiments, allowing a single flow fuse 112 to isolate pressurized oxygen flow from multiple oxygen tanks 104.

In some embodiments, flow fuse 112, when in the second position, may allow some pressurized oxygen to pass so as to not cause too high of a pressure in the tubing upstream of flow fuse 112. In this case, pressure relief system 110 may include a pressure relief valve 114 located downstream of flow fuse 112. Pressure relief valve 114 may, in embodiments, be configured to release pressurized oxygen upon exposure to a predetermined pressure, therein relieving oxygen system 102 of overburdening pressure. In embodiments, flow fuse 112 partially blocks high pressure oxygen (e.g., from sudden surges of high pressure) while pressure relief valve 114 releases excess pressure downstream of flow fuse 112.

In some embodiments, pressure relief system 110 may comprise multiple pressure relief valves 114. For example, in some embodiments there may be one pressure relief valve 114 downstream of every flow fuse 112. In some embodiments, pressurized oxygen from multiple flow fuses 112 may feed into a single pressure relief valve 114. For example, if multiple oxygen tanks 104 and pressure regulators 106 feed pressurized oxygen into multiple flow fuses 112, these multiple sources of pressurized oxygen may converge into a single pressurized oxygen flow at a common manifold. Subsequently, this single pressurized oxygen flow may be fed into a single pressure relief valve 114, therein the single relief valve 114 serves multiple pressurized oxygen sources. In some embodiments, pressure relief valve 114 may comprise a pneumatically-actuated valve, such as a poppet valve. In some embodiments, pressure relief valve 114 may comprise an internal poppet spring-loaded in the closed position, wherein internal static oxygen pressure pushes against the spring. In some embodiments, if the pressure becomes too high (i.e., above a threshold pressure), the force may overcome the spring force and open the pressure relief valve 114. For example, pressure relief valve 114 may be configured to open upon exposure to a pressure of about 100 psi and above. Pressure relief valve 114, in the open configuration, may be configured to release pressurized oxygen out of the oxygen system 102 into the ambient air. In some embodiments, pressure relief valve 114, in the open configuration, may be configured to release pressurized oxygen out of the oxygen system 102 into the unpressurized compartment (e.g., compartment 50), forming a concentrated oxygen area therein. In these embodiments, sufficient venting of the concentrated oxygen in the unpressurized compartment may be needed to prevent oxygen build-up, and subsequent fire risk, within the compartment. This will be discussed further below with relation to other components of the oxygen pressure relief and ventilation system 100, such as ventilation system 130.

Within oxygen system 102, there are several possible failure modes of the pressure regulator 106. All failure modes may be classified into two categories: failures resulting in a small leak, and failures resulting in a large leak. If a failure resulting in a large leak occurs, flow fuse 112 may close as previously described to isolate the pressurized oxygen flow, therein preventing a surge of pressurized oxygen from reaching the supply system 120. Any leakage through flow fuse 112 may cause the pressure supplied to supply system 120 to slowly increase. In embodiments, the pressure may continue to increase until one or more pressure relief valves 114 open due to the threshold pressure being reached. If a failure resulting in a small leak occurs, the flow fuse 112, may, in embodiments, remain open due to the drag force resulting from the small amount of pressurized oxygen flow not allowing flow fuse 112 to close. In this case, the pressure supplied to the supply system 120 will slowly increase. The pressure may continue to increase until the one or more pressure relief valves 114 open to limit the increase in pressure. In this way, flow fuse 112 and pressure relief valve 114 function cooperatively together to protect against all possible failure modes of the pressure regulator 106.

In some embodiments, oxygen pressure relief and ventilation system 100 may further include a ventilation system 130. In some embodiments, ventilation system 130 may be a subsystem of oxygen pressure relief and ventilation system 100. Ventilation system 130, may, in some embodiments, dilute the concentrated oxygen in the compartment (e.g., compartment 50) when the concentrated oxygen resulted from the operation of the one or more pressure relief valves 114, or other possible system leakages. In some embodiments, cabin pressurized air 124 from occupied compartment 40 (e.g., cockpit 20 and/or cabin 30) is used to ventilate the unpressurized compartment 50. In some embodiments, ventilation system 130 comprises a fluid connection connecting one or more of the cockpit 20 and/or cabin 30 to the compartment 50. While depicted in FIG. 4A as connecting unpressurized compartment 50 and occupied compartment 40, it is contemplated that any pressurized compartment may be connected to any unpressurized compartment to subsequently allow for ventilation of the unpressurized compartment.

In some embodiments, ventilation system 130 comprises a pathway configured to allow cabin pressurized air 124 to pass from the pressurized compartment (e.g., unoccupied compartment 40) to the unpressurized compartment (e.g., compartment 50). The pathway may comprise tubing that connects to an opening through a barrier, such a wall 150 between the pressurized and unpressurized compartments. Cabin pressurized air 124, in some embodiments, provides a range of flow rates to substantially ventilate the unpressurized compartment while not interfering with the ability of the pressurization system to pressurize the cockpit 20 and cabin 30. For example, if the flow rate of ventilation system 130 is too high, allowing too much air to flow freely from the pressurized compartment to the unpressurized compartment, then the pressurization system will not be able to compensate for the lost pressure and will therefore lose pressurization of the cockpit 20 and cabin 30. Alternatively, if the flow rate of the ventilation system 130 is too low, not allowing enough air to flow from the pressurized compartment to the unpressurized compartment, then proper ventilation of the unpressurized compartment will not occur, therein not diluting the concentrated oxygen which originated, for example, from pressure relief valves 114. Due to the aforementioned requirements of ventilation system 130, in some embodiments, ventilation system 130 may comprise a regulated mechanism configured to allow a precise flow rate of cabin pressurized air 124 into the unpressurized compartment.

Figure 4A:
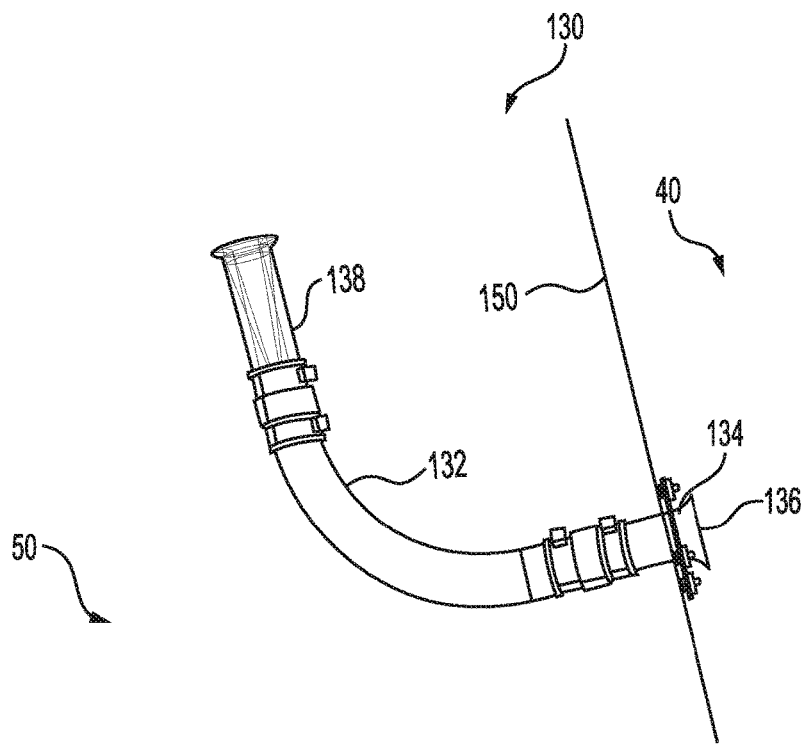
FIG. 4A shows a second portion of the oxygen pressure relief and ventilation system of FIG. 2, in some embodiments.

As depicted in FIG. 4A, in some embodiments, ventilation system 130 may comprise a tube 132. Tube 132 is configured to allow a fixed flow rate of ventilation air (e.g., cabin pressurized air 124) to enter the unpressurized compartment, dependent upon the difference in pressure between the pressurized and unpressurized compartments. Tube 132, in embodiments, includes a connection 134 between the unpressurized compartment 50 and the occupied compartment 40. Connection 134 may comprise a hole through wall 150 between the compartments by which tube 132 may be secured. Tube 132 may further include inlet 136. Inlet 136, in some embodiments, may include internal mechanisms by which to adjust air flow therethrough. For example, inlet 136 may include a flow-limiting device such as a valve, wherein a specific amount of pressure allows ventilated air to flow through tube 132. In some embodiments, inlet 136 may be configured to minimize noise penetration into the pressurized compartment. Tube 132 may further include a throat 138 disposed at an outlet of tube 132. In some embodiments, throat 138 may be sized to allow the proper amount of ventilation air through tube 132. In certain embodiments, throat 138 comprises a fixed venturi-style throat.

Figure 4B:
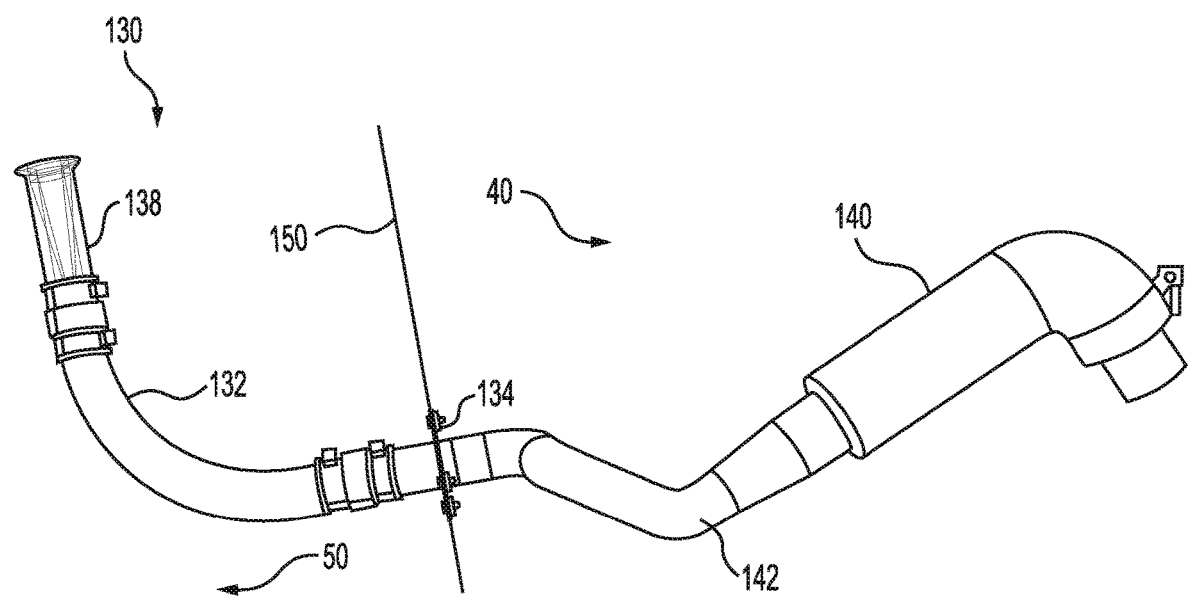
FIG. 4B shows the second portion of FIG. 4A with a muffler installed, in some embodiments.

As depicted in FIG. 4B, ventilation system 130 may include a muffler 140 in some embodiments. Muffler 140 is configured for reducing noise produced by ventilation system 130. For example, muffler 140 may comprise a hollow perforated tube wrapped in sound damping material and a flexible outer shell that encloses the sound damping material. Muffler 140 may be installed upstream of tube 132 in the occupied (i.e., pressurized) compartment 40 (as shown in FIG. 4B), or muffler 140 may be installed in unpressurized compartment 50 (not shown) so long as the muffler 140 is installed upstream of throat 138. Tubing 142 is used to fluidly connect tube 132 with muffler 140.

In some embodiments, unpressurized compartment 50 may include a vent (not shown) that allows air to exit from the unpressurized compartment 50 into the ambient environment. Such a vent may prevent unpressurized compartment 50 from becoming pressurized. Furthermore, such a vent may allow for proper ventilation of the unpressurized compartment 50 if a concentrated oxygen environment occurs.

The benefits of ventilation system 130 providing ventilated air from a pressurized compartment rather than ambient air from outside aircraft 10 are three-fold. First, the use of ventilated air avoids introducing additional moisture or other contaminants into the unpressurized compartment that may be present in the ambient air. Second, ventilated air from the pressurized compartment is typically controlled to room temperature. Therefore, fluctuations of the air temperature within the unpressurized compartment are less extreme than they may be when ventilating with ambient air. This may increase reliability of, for example, electronic components which may be present in the unpressurized compartment 50. Third, ventilation from internally provided ventilated air prevents aerodynamic drag of the aircraft 10 which may otherwise be exerted due to ventilation with external ambient air.

Overall, oxygen pressure relief and ventilation system 100, in embodiments, may mitigate and prevent damages caused by a failure of the pressure regulator 106 in three separate ways. First, flow fuse 112 may isolate pressurized oxygen upon an increase in pressure, thereby preventing it from reaching and damaging downstream components, such as oxygen masks 122. Second, pressure relief valve 114 may release pressure from the oxygen system 102, further mitigating the increase in pressure on the oxygen system 102 due to a failure of the pressure regulator 106. Third, a significant increase in oxygen levels in the unpressurized compartment 50 via concentrated oxygen is prevented by ventilation system 130 by providing a sufficient amount of ventilated air to dilute the concentrated oxygen, therein mitigating the risks of a fire onboard due to significantly high oxygen concentrations.

Figure 5:
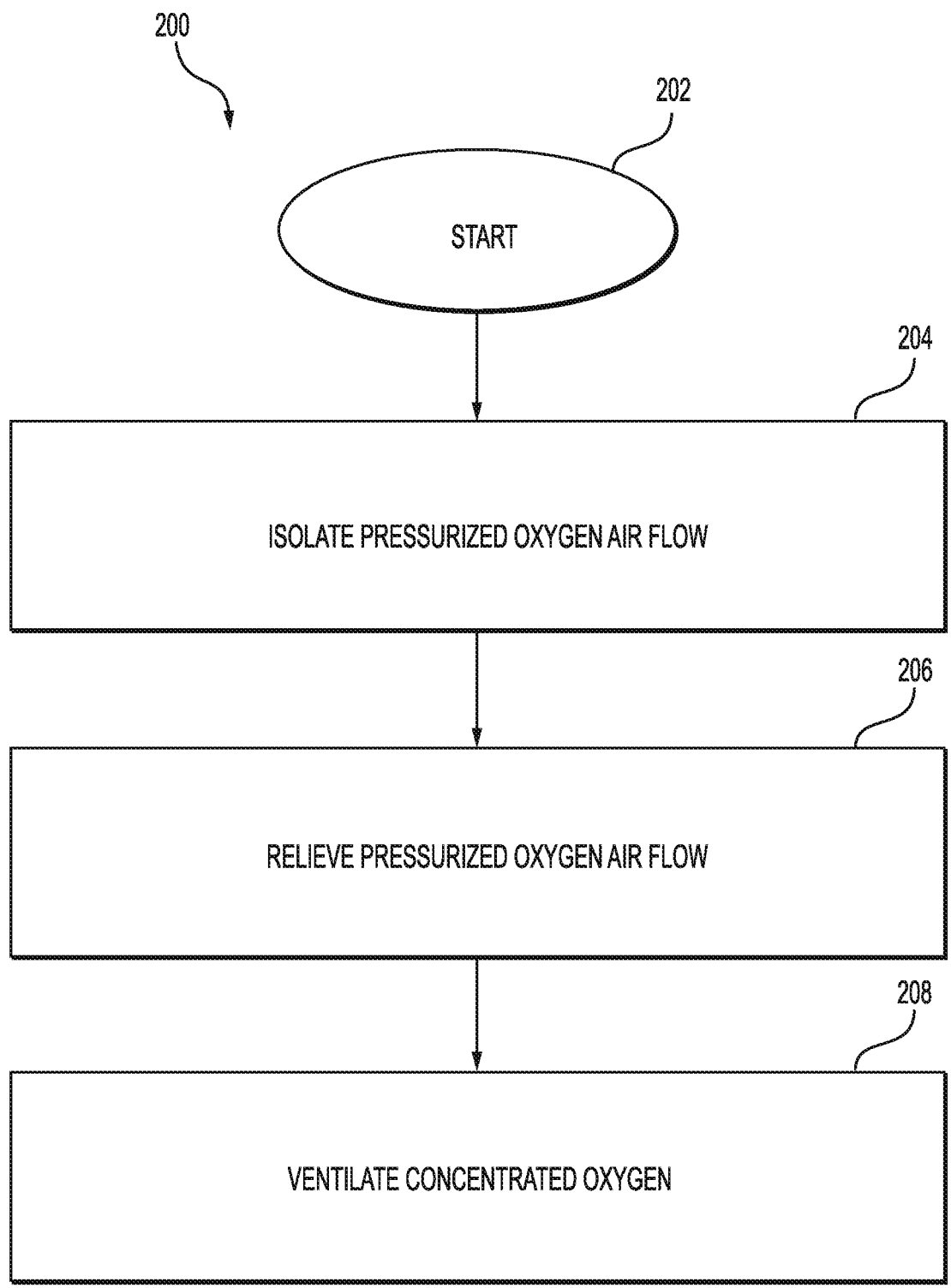
FIG. 5 is a process-flow diagram illustrating an oxygen pressure relief and ventilation method using the system of FIGS. 2-4, in an embodiment.

Turning now to FIG. 5, a process flow diagram is depicted illustrating an exemplary oxygen pressure relief and ventilation method 200, performed using, for example, the oxygen pressure relief and ventilation system 130 of FIGS. 2, 4A and 4B.

In a step 202, the oxygen pressure relief and ventilation method 200 starts.

In a step 204, the pressurized oxygen flow is isolated. In an example of step 204, a flow fuse (e.g., flow fuse 112) may be used to isolate pressurized oxygen if a threshold pressure is reached. For example, if a pressure regulator (e.g., pressure regulator 106) fails, and a significant increase in pressurized oxygen is received by the system (e.g., oxygen system 102), the downstream components, such as oxygen masks 122, may need to be protected from a surge in pressure. As such, the pressurized oxygen is isolated from the downstream components via the flow fuse, thereby preventing the downstream components from being damaged.

In a step 206, the pressurized oxygen flow is relieved. In an example of step 206, pressure relief valves (e.g., pressure relief valve 114) open in response to an increase in pressure caused by, for instance, a failed pressure regulator (e.g., pressure regulator 106). In this step, one or more pressure relief valves may operate to relieve pressure from the system (e.g., oxygen system 102) by releasing pressurized oxygen. The one or more pressure relief valves may be located downstream of the flow fuse such that the flow fuse and pressure relief valve(s) function together to protect against all possible failure modes of a pressure regulator, as described above. In embodiments, the pressurized oxygen is released into an unpressurized compartment such as compartment 50.

In a step 208, concentrated oxygen is ventilated. In an example of step 208, compartment 50 is ventilated using an internal ventilation system (e.g., ventilation system 130). In another example, a ventilation system may release ventilated air from a pressurized compartment (e.g., cockpit 20 or cabin 30) into the unpressurized compartment 50 to dilute the concentrated oxygen within the unpressurized compartment 50. In some embodiments, the unpressurized compartment 50 may include a vent that allows air to exit from the unpressurized compartment into the ambient environment. The concentrated oxygen may result from a leak of the oxygen system 102 or from release of pressurized oxygen via pressure relief valve 114, for example. Such a ventilation system may reduce fire risk within the unpressurized compartment by reducing the oxygen concentration.

Oxygen pressure relief and ventilation method 200 vastly improves the efficacy and safety of onboard oxygen supply systems. Currently, minimal or no safety mechanisms exist for many aircraft to respond to a failed pressure regulator. As such, there is a significant need for protection systems and methods to prevent damage to critical air supply components onboard the aircraft as well as significant fire risk due to a large increase in oxygen concentrations within a compartment of the aircraft.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An oxygen pressure relief and ventilation system, comprising:
    a flow fuse fluidly coupled downstream of a pressure regulator, wherein the pressure regulator is operatively coupled to an oxygen tank, and the oxygen tank is located in an unpressurized compartment of an aircraft;
    a pressure relief valve fluidly coupled downstream of the flow fuse; and
    a ventilation pathway fluidly coupling the unpressurized compartment with a pressurized compartment,
    wherein the flow fuse and the pressure relief valve are configured to cooperatively mitigate downstream flow of pressurized oxygen if the pressure regulator fails, and
    wherein the ventilation pathway is configured to allow air from the pressurized compartment to pass through to the unpressurized compartment for diluting a concentrated oxygen in the unpressurized compartment.

2. The system of claim 1, wherein the flow fuse comprises a pneumatically-actuated valve.

3. The system of claim 1, wherein the flow fuse comprises a spring-loaded mechanism that biases the flow fuse into a first position that allows flow of oxygen to pass.

4. The system of claim 3, wherein the spring-loaded mechanism is configured such that when the pressure of oxygen surpasses a predetermined pressure, a force of the spring-loaded mechanism is overcome thereby pushing the flow fuse to a second position that substantially blocks flow of oxygen for protecting downstream components.

5. The system of claim 4, wherein the flow fuse automatically resets back to the first position when the pressure of oxygen from upstream is restored to below the predetermined pressure.

6. The system of claim 4, wherein the second position is configured to allow some pressurized oxygen to pass for limiting an upstream pressure while also protecting downstream components.

7. The system of claim 6, wherein the pressure relief valve is located in the unpressurized compartment and configured to vent pressurized oxygen that has passed the flow fuse into the unpressurized compartment.

8. The system of claim 7, wherein the pressure relief valve is configured to vent pressurized oxygen upon exposure of the pressure relief valve to a predetermined pressure.

9. The system of claim 1, wherein the ventilation pathway comprises a tube configured to allow a fixed flow rate of air from the pressurized compartment to pass through a barrier to the unpressurized compartment.

10. The system of claim 9, wherein the ventilation pathway comprises an inlet having a flow-limiting device that is opened by a predetermined amount of pressure to allow air to flow through the tube.

11. The system of claim 9, wherein the tube comprises an outlet having a throat configured to allow a predetermined amount of air through the tube.

12. The system of claim 9, wherein the tube comprises a muffler configured for reducing noise produced by the ventilation pathway.

* * * * *